United States Patent

Koketsu et al.

[11] Patent Number: 4,624,234
[45] Date of Patent: Nov. 25, 1986

[54] ELECTRONIC IGNITION TIMING ADJUSTING SYSTEM FOR INTERNAL COMBUSTION ENGINES

[75] Inventors: Hisakazu Koketsu; Toshihiro Saga, both of Kariya; Toshitaka Yamada, Nagoya; Tiaki Mizuno, Toyota; Takamichi Nakase, Gamagori, all of Japan

[73] Assignee: Nippondenso Co., Ltd., Kariya, Japan

[21] Appl. No.: 713,681

[22] Filed: Mar. 20, 1985

[30] Foreign Application Priority Data

| Mar. 21, 1984 | [JP] | Japan | 59-54769 |
| Nov. 21, 1984 | [JP] | Japan | 59-247248 |
| Dec. 20, 1984 | [JP] | Japan | 59-270282 |
| Dec. 21, 1984 | [JP] | Japan | 59-271556 |

[51] Int. Cl.$^4$ ............... F02P 3/04; F02P 5/155
[52] U.S. Cl. ............... 123/602; 123/149 C; 123/623
[58] Field of Search ............... 123/149 C, 418, 427, 123/599, 602, 623, 630

[56] References Cited

U.S. PATENT DOCUMENTS

4,473,050  9/1984  Kondo et al. ............... 123/418 X

FOREIGN PATENT DOCUMENTS

| 3200856 | 12/1982 | Fed. Rep. of Germany | 123/630 |
| 113733 | 9/1979 | Japan . | |
| 84863 | 6/1980 | Japan . | |
| 112864 | 9/1980 | Japan | 123/602 |
| 134758 | 10/1980 | Japan | 123/602 |
| 143351 | 11/1981 | Japan . | |
| 20559 | 2/1982 | Japan . | |
| 212369 | 12/1982 | Japan | 123/599 |
| 44271 | 3/1983 | Japan . | |

Primary Examiner—Tony M. Argenbright
Attorney, Agent, or Firm—Cushman, Darby & Cushman

[57] ABSTRACT

An ignition timing adjusting system for an internal combustion engine wherein the output of a magneto-type generator driven by the engine is used as a power source to generate a constant voltage output through a voltage regulator circuit, and a rotational angular position of the engine is detected by a sensor and the corresponding output signal being used as a reference signal in order to electronically determine an ignition timing by an advance angle computing circuit energized by the constant voltage output of the voltage regulator circuit, and further detecting the constant voltage output of the regulator circuit, and an advance angle adjusting circuit cancels the computed output from the advance angle adjusting circuit when the detected voltage is less than a voltage which is an absolute minimum voltage necessary for the accurate ignition timing operation, whereby when the detected constant voltage output is not adequately regulated the computed output of the advance angle adjusting circuit causing the excessively advanced ignition timing is ignored, instead, forcibly timing the ignition to occur at the low-speed fixed angular position.

11 Claims, 18 Drawing Figures

ELECTRONIC IGNITION TIMING ADJUSTING SYSTEM FOR INTERNAL COMBUSTION ENGINES

FIELD OF THE INVENTION

The present invention relates to an electronic ignition timing adjusting system for an internal combustion engine, and more specifically the invention relates to a system capable of providing constant and stable ignition timing even when the power supply voltage for the system is not yet adequately regulated.

DESCRIPTION OF THE PRIOR ART

In prior art, an angular position detecting sensor is provided which produces a positive signal voltage and a negative signal voltage for every engine rotation, in synchronism with the engine speed, and the positive voltage is used as a first fixed angular signal, the rising position $\theta_H$ of which is adjusted to a high-speed fixed angular position. On the other hand, the negative voltage is used as a second fixed angular signal, the falling position $\theta_L$ of which is adjusted to a low-speed fixed angular position. An advance angle computing circuit includes a capacitor which starts charging with a constant current at the pulse-falling position $\theta_L$ and at the pulse-rising position $\theta_H$ stops charging and simultaneously starts discharging with a constant current, thus generating a sawtooth-waveform-signal. While discharging there is a point at which the discharging voltage level coincides with a reference voltage, which is used as the ignition point or timing. When the engine rotates at the lower speeds such as an idling mode at start up, an enough power supply voltage for the circuits is not obtained yet so that a thyristor for ignition is driven directly during the negative voltage cycle of the sensor signal, and at this time, the low-speed fixed angular position $\theta_L$ is used for the ignition timing. When the engine rotates at the middle engine speeds, as described above, such an angular position at which the discharging voltage coincides with the reference voltage is used as the ignition timing. On the other hands, at the high engine speeds or when there is not enough charge on the capacitor to reach at the reference voltage, at this time, the high-speed fixed angular position $\theta_H$ is thus used as the ignition timing.

However, a disadvantage of the above-described known ignition system is that when the engine speed is low at start up, the power supply voltage for the circuits is not yet adequately regulated and the engine is operated at an excessive advance angle mode, therefore, the engine can not reach at the top dead center, thus resulting in kick-back effects of the engine or a damage to the engine. This is because that when the power supply voltage for the circuits is adequately regulated, the terminal voltage of the capacitor after its discharge is larger than the reference voltage, therefore, the ignition is timed to occur at the low-speed fixed angular position $\theta_L$, however, when the engine speed is low, for example, at start up where the power supply voltage for the circuits is not yet adequately regulated, not having reached a saturated and constant voltage, the voltage of the sawtooth-waveform signal of the capacitor becomes lower in response to the power supply voltage applied at that time so that the discharge portion of the sawtooth-waveform signal reaches the reference voltage at a position which is advanced in time with respect to the position $\theta_L$, as a result, the ignition is timed to occur at such advanced angular position.

In order to solve the above-described disadvantage, a Japanese unexamined Pat. Appln. No. 57-20559 has disclosed a system comprising a capacitor, a constant current circuit for charging the capacitor with constant current and an engine rotational speed detecting circuit including a comparator for not producing an ignition timing signal when the engine rotational speed is less than a predetermined set value.

However, even if the above-known system is applied, the terminal voltage of the capacitor is set still low during a time that the power supply voltage for the circuits is not adequately regulated soon after cranking the engine, this corresponds to such a situation where the engine rotational speed is higher than the predetermined set value so that the circuit for not generating the ignition timing signal at the engine rotation speeds less than the set value is out of order.

SUMMARY OF THE INVENTION

In view of the above-mentioned fact, it is therefore an object of the present invention to provide an electronic ignition timing adjusting system for an internal combustion engine wherein even during a time that a power supply voltage for energizing the circuits is not yet adequately regulated such as at start up, the ignition is ensurely timed to occur at the low-speed fixed angular position.

It is another object of the present invention to provide an electronic ignition timing adjusting system for an internal combustion engine which is capable of preventing the first miss-fire even when the power supply voltage for the circuits has risen up soon after cranking the engine.

In order to accomplish these objects as well as their specifies, and according to a feature of the present invention the invented system comprises an electronic ignition timing adjusting system for an internal combustion engine in order to operate the engine with the electronically adjusted ignition timing, said ignition timing adjusting system comprising:

(1) a magneto-type generator driven by said internal combustion engine;

(2) a constant voltage circuit energized by the output of said generator as its power source and for producing a constant voltage output having a constant voltage value;

(3) angular position detecting means for detecting two different angular positions of a crank shaft of said engine to generate the corresponding detection signals;

(4) an advance angle computing circuit connected to said angular position detecting means and said constant voltage circuit for receiving said corresponding detection signal as reference signals and for producing an electronically computed ignition timing signal in relation to said constant voltage output from said constant voltage circuit as its power source;

(5) an advance angle adjusting circuit connected to said constant voltage circuit for detecting said constant voltage output from said constant voltage circuit and for cancelling said electronically computed ignition timing signal when said constant voltage output from said constant voltage circuit is lower than a voltage which is an absolute minimum voltage necessary for the accurate ignition timing compute.

The invented system further comprises, so as to accomplish the above-noted second object, an electronic ignition timing adjusting system for an internal combustion engine in order to operate the engine with the electronically adjusted ignition timing, said computing output signal from said ignition timing adjusting system comprising:

(1) a magneto-type generator driven by said internal combustion engine;

(2) a constant voltage circuit energized by the output of said generator as its power-source and for producing a constant voltage output;

(3) angular position detecting means for detecting for a first reference angular position and a second reference angular position not greater than said first reference angular position and generating corresponding detection signals at said first and second reference angular positions;

(4) an advance angle computing circuit connected to said angular position detecting means and said constant voltage circuit for receiving said corresponding detection signals as reference signals, and producing an electronically computed ignition timing signal in response to said constant voltage output and said reference signals;

(5) a power-supply voltage detecting circuit connected to said constant voltage circuit for detecting said constant voltage output from said constant voltage circuit and discriminating whether or not said constant voltage output is an absolute minimum voltage level necessary for computing accurate ignition timing by said advance angle computing circuit;

(6) a reset-set circuit connected to said power-supply voltage detecting circuit and being set by said corresponding detection signal generated at said second reference angular position and being reset when said constant voltage output of said constant voltage circuit is less than said absolute minimum voltage level; and (7) an advance angle adjusting circuit connected to said reset-set circuit for cancelling said electronically computed ignition timing signal during a time that said reset-set circuit is reset, and for timing the ignition to occur at said second reference angular position by said corresponding detection signal.

DESCRIPTION OF PREFERRED EMBODIMENT

Hereinafter, an ignition timing adjusting system for an internal combustion engine will now be explained in greater detail according to its embodiments with reference to the drawings of FIGS. 1 to 16, as in the case of a one-cylinder, four cycle magneto-type generator.

Figure 1:
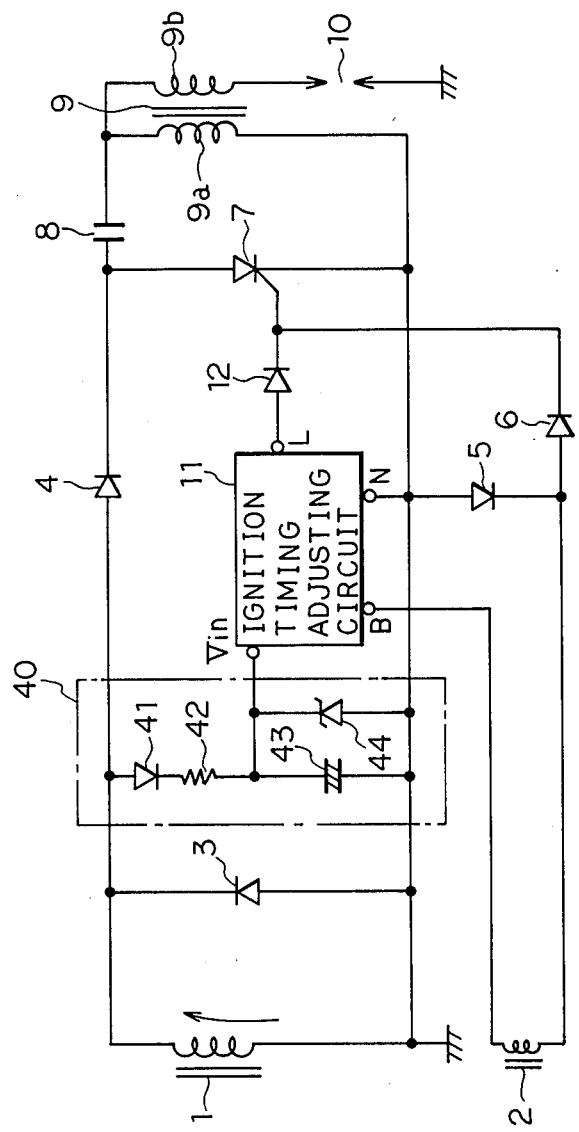
FIG. 1 shows a wiring diagram of a first embodiment of the system according to the present invention.

Referring now to FIG. 1 showing a first embodiment of this invention, a positive direction output (in the direction of the arrow) of a coil 1 charges a capacitor 43 through a diode 41 and a resistor 42. A diode 44 is connected in series with the capacitor 43 to thereby limit its peak charge voltage to the zener voltage. The diode 41, the resistor 42, the capacitor 43 and the zener diode 44 make up a power-supply circuit 40.

Numeral 2 designates a sensor, 3 and 4 diodes, 7 a thyristor, 8 a main capacitor, 9 an ignition coil, 9a and 9b a primary and secondary coils of the ignition coil 9, 10 a spark plug, these being connected to form a known capacitor-discharge type ignition circuit.

An ignition timing adjusting circuit 11 receives the charge-voltage of the capacitor 43 and a signal voltage from the sensor 2 as its inputs, and produce an output to trigger the thyristor 7. Diodes 5, 6 and 12 make up an OR circuit to trigger the thyristor 7 and this OR circuit receives its input signals from the ignition timing adjusting circuit 11 and the sensor 2.

Figure 4:
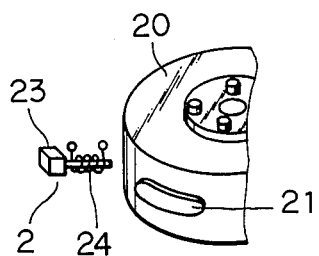
FIG. 4 shows a perspective side view of the angular position detecting sensor of FIG. 1.

A perspective side view of the sensor 2 of FIG. 1 is shown in more detail in FIG. 4. In the figure, numeral 20 designates a rotor having a projection 21, the projection 21 being as arranged on its outer periphery that it has mechanical angle required for a necessary advance angular width. The sensor 2 is an electromagnetic pickup consisting of a signal coil 24 and a permanent magnet 23 arranged adjacent to the outer periphery of the rotor 20 with a predetermined angular displacement therebetween to face the projection 21 on the rotor 20. Therefore, if the rotor 20 is rotated the projection 21 passes through the sensor 2 so that the sensor 2 generates in one cycle voltage signals consisting of positive and negative pulses with the necessary advance angular width for every rotation of the rotor 20.

Figure 2:
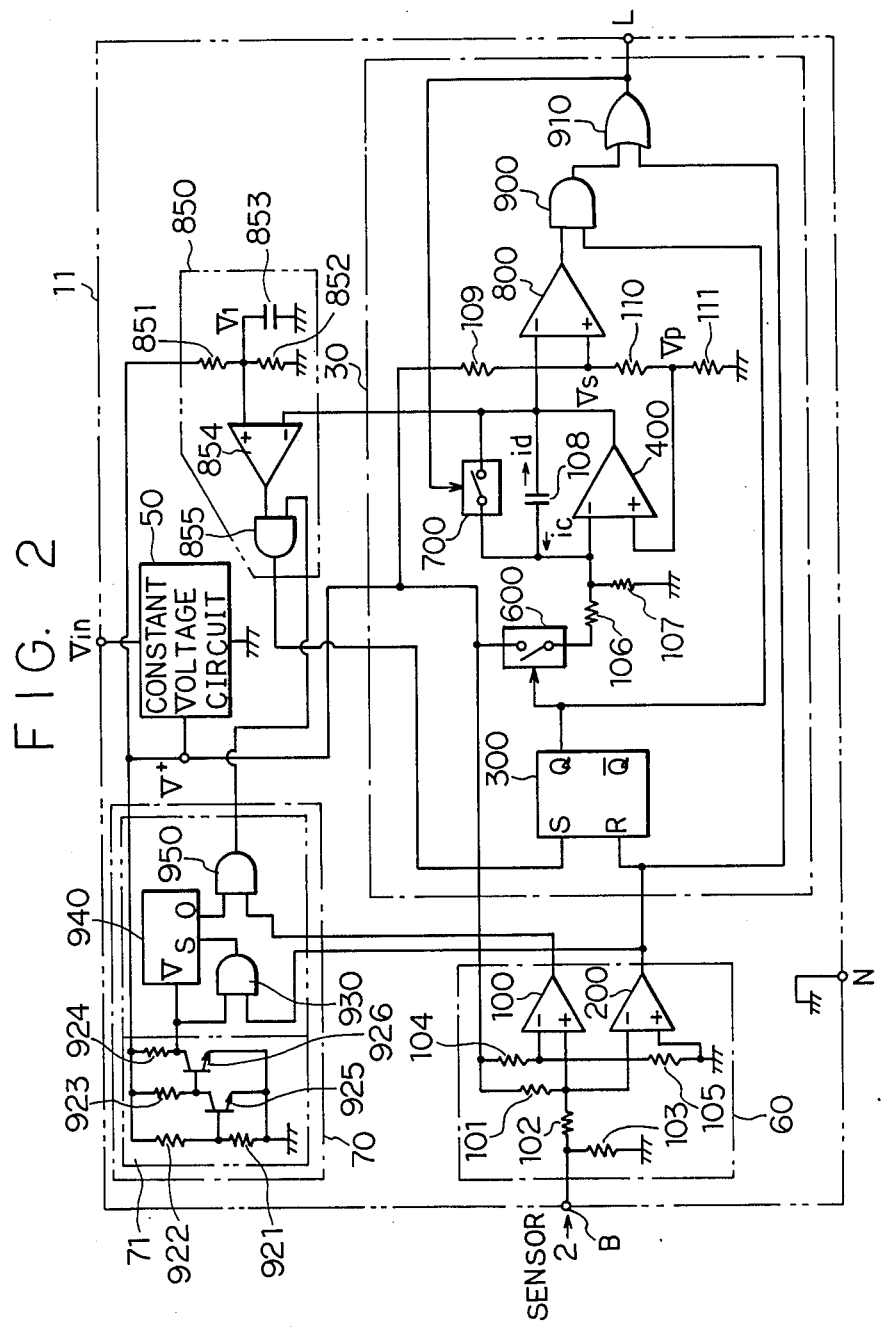
FIG. 2 shows a detailed wiring diagram of an ignition timing adjusting circuit of the first embodiment of the system of the present invention shown in FIG. 1.

The detailed construction of the ignition timing adjusting circuit 11 of FIG. 1 is shown with reference to FIG. 2. The terminal voltage of the capacitor 43 is pulsative so that it is smoothed out through a constant voltage circuit 50, the constant voltage V+ being used as the power-source for an advance angle computing circuit 30 comprising comparators, logic circuits and a flip-flop, a reference angular position signal generating circuit 60, an advance angle adjusting circuit 70 and a rotational speed detecting circuit 850. The signal output from the sensor 2 is biased with resistors 101, 102 and 103, and its bias voltage are inputted to one of the input terminals of comparators 100 and 200, respectively. The other input terminal of the comparator 100 is connected to a juncture between resistors 104 and 105. On the other hand, the other input terminal of the comparator 200 is grounded. The above-described comparators 100 and 200, and the resistors 101 to 105 form the reference angular position signal generating circuit 60. The output of the comparator 100 is used as a set signal for a flip-flop 300 via the advance angle adjusting circuit 70 and the rotational speed detecting circuit 850, and an output of the comparator 200 as a reset signal for the flip-flop 300.

Figure 3:
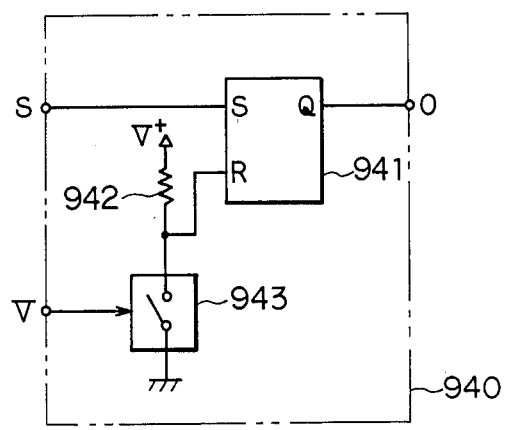
FIG. 3 shows a detailed wiring diagram of a reset-set circuit used in the first embodiment of the system of the present invention shown in FIG. 2.

The advance angle adjusting circuit 70 comprises a power-supply voltage detecting circuit 71 including resistors 921 to 924 and transistors 925 and 926, and an input control circuit 72 comprising AND circuits 930 and 950 and a set circuit 940. When the output voltage V+ of the constant voltage circuit 50 becomes larger than a predetermined value the power-supply voltage detecting circuit 71 thus generates a high level output at the collector of a transistor 926. The collector of the transistor 926 being connected to the AND circuit 930 and a reset cancellation terminal V of the set circuit 940. The output terminal of the AND circuit 930 is connected to a set-input terminal of the set circuit 940. The set circuit 940, as shown in FIG. 3, comprises a flip-flop 941, a resistor 942 connected between the output voltage V+ of the constant voltage circuit 50 and the reset terminal R of the flip-flop 941, and an analog switch 943 connected between the reset terminal R of the flip-flop 941 and the ground. The analog switch 943 is closed to ground and the reset input terminal R of the flip-flop 941 when the power-supply voltage detecting circuit 71 is the high level. A set input terminal S of the set circuit 940 is internaly connected in the circuit to the set terminal of the flip-flop 941 and a terminal Q of the flip-flop 941 is an output terminal O of the set circuit 940, and thus when a "1" level signal is inputted to the set input terminal S the set circuit 940 generates a "1" level signal in synchronism with the leading edge portion of the incoming "1" level signal, thereafter, holding the "1" level. The output terminal O of the set circuit 940 is connected to the AND circuit 950 so that an ouput of the AND circuit 950 is also an output signal of the advance angular adjusting circuit 70.

On the other hand, in the advance angle computing circuit 30, an operational capacitor 108 is connected between the input (—) and output terminals of an operational amplifier 400 to form an integral circuit. An analog switch 700 for reset-use is further connected in parallel with the capacitor 108. The inverting terminal (—) of the operational amplifier 400 is connected to a juncture between resistors 106 and 107 and the other end of the resistor 106 is connected through an analog switch 600 to the output voltage line V+, the other end of the resistor 107 being grounded. The other input terminal (+) of the operational amplifier 400 has a reference voltage V$_P$, a divided voltage divided by resistors 109 to 111 inserted between the output voltage V+ and the ground, whereas when analog switches 600 and 700 are both opened the operational capacitor 108 is charged through the resistor 107 with a constant current ic and when the switch 600 is closed and the switch 700 is opened the operational capacitor 108 starts the discharge through the resistor 106 with a constant current id, and in this condition, if the switch 700 is also closed, the capacitor completes the discharge in a moment. The switches 600 and 700 are arranged so that the switch 600 is closed when the output Q of the flip-flop 300 is a "1" level and the switch 700 is closed when an OR circuit 910 generates a "1" level output. Reference voltages V$_S$ and V$_P$ are produced by the afore-mentioned dividing resistors 109 to 111 dividing the output voltage V+ of the constant voltage circuit 50. The reference voltage V$_S$ appeared at a juncture between resistors 110 and 111 and the terminal voltage of the operational capacitor 108 are used as inputs for a comparator 800, the output of the comparator 800 and the output Q of the flip-flop 300 being connected to two input terminals of an AND circuit 900 respectively. The OR circuit 910 receives as its inputs the output of the AND circuit 900 and the set signal of the flip-flop 300 in the advance angle computing circuit 30. An output of the OR circuit 910 is used as an ignition timing signal also being an advance angle signal, whereas when the output of the OR circuit 910 is so high that the switch 700 is closed, the operational capacitor 108 is forced to complete the discharge in a moment.

The rotational speed detecting circuit 850 comprises a simple series-parallel combination of resistors 851 and 852 and a capacitor 853 which divides the output voltage V+ and generates a reference voltage V$_1$ developed across the resistor 852, a comparator 854 for comparing the reference voltage V$_1$ with the terminal voltage of the operational capacitor 108, and an AND circuit 855 which receives as its inputs the output of the comparator 854 and the output of the AND circuit 950. The output of the AND circuit 855 is so connected to the set terminal S of the flip-flop 300 that it is used as a set signal for setting the flip-flop 300, whereby the reference voltage V$_1$ is varied by the capacitor 853 as the output voltage V+ of the constant voltage circuit 50 varies until it reaches the saturated and constant voltage level or it is adequately regulated.

Figure 5:
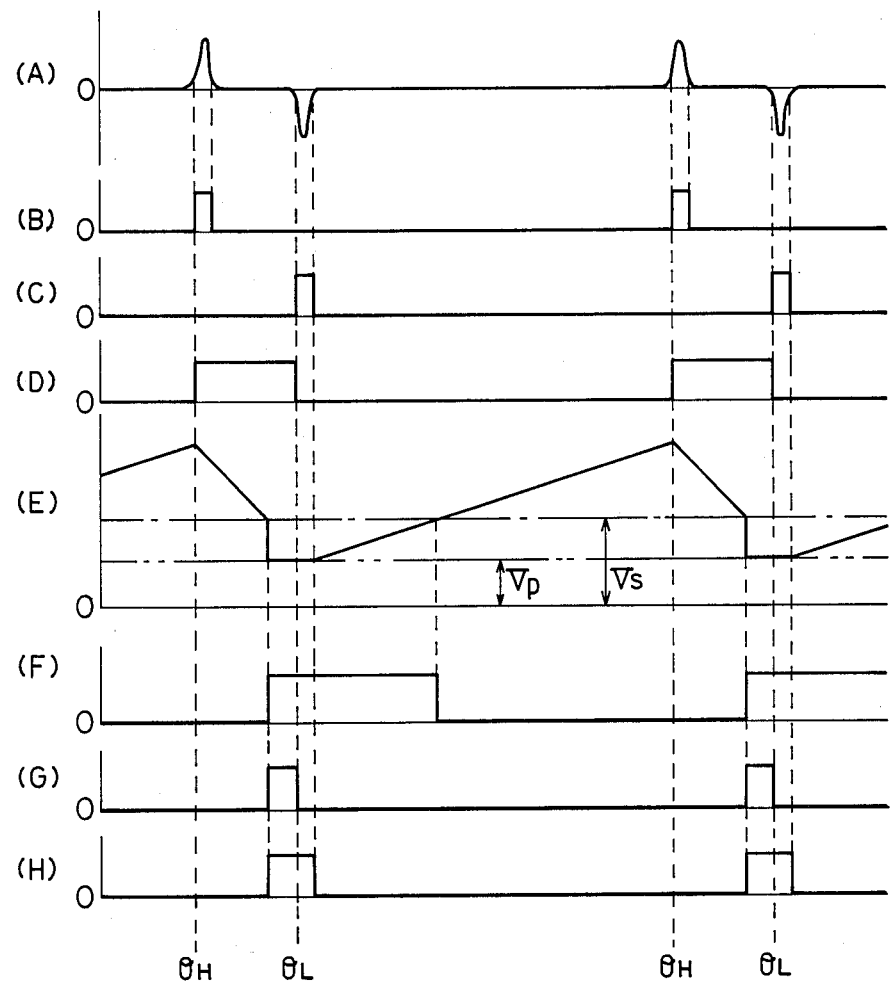
FIGS. 5, 7 and 8 are signal waveform diagrams useful for explaining the operation of the various parts of the circuit shown in FIG. 2.

With the detailed construction described above, the operation of the ignition timing adjusting circuit 11 of the present invention will now be first described as in the case of the engine operated at the middle speed, where the output voltage V+ of the constant voltage circuit 50 is adequately regulated or remains essentially constant. The sensor 2 generates a pair of a positive and negative pulses for each rotation of the rotor 20 as shown by (A) in FIG. 5. The comparator 100 outputs a pulse signal in synchronism with the positive pulse from the sensor 2 as shown by (B) in FIG. 5 and the comparator 200 outputs a pulse signal in synchronism with the negative pulse as shown by (C) in FIG. 5. At this time, since the output voltage V+ of the constant voltage circuit 50 has already reached its saturation voltage level and remains essentially constant and the rotational speed is more than a predetermined level and thus the outputs of the comparator 100 and 200 can be used as the set and reset signals respectively for the flip-flop 300. The leading edge portions of the set and reset signals are in synchronism with the high and low-speed fixed advance angular positions $\theta_H$ and $\theta_L$ respectively, whereby, as shown by (D) in FIG. 5, the Q output of the flip-flop 300 goes high at the angular position $\theta_H$ and goes low at the angular position $\theta_L$. As described above, the switch 600 is closed when the Q output of the flip-flop 300 is a high level, therefore, the operational capacitor 108 charged with the constant current ic in turn starts the discharge with the constant current id at the leading edge portion of the set signal (the angular position $\theta_H$), thus the terminal voltage of the operational capacitor 108 gradually decreases. When the decreasing discharge voltage of the operational capacitor 108 and the reference voltage $V_S$ are so compared by the comparator 800 that the discharging voltage of the operational capacitor 108 is lower than the reference voltage $V_S$, the comparator 800 generates a high level output as shown by F in FIG. 5. FIG. 5 (F) shows, as noted above, the output of the comparator 800 at the middle-speed fixed advance angle mode and those of other engine speed fixed advance angle mode are described later. The AND circuit 900 receives as its inputs the output of the comparator 900 and the Q output of the flip-flop 300, as a result, generating an output as shown by (G) in FIG. 5. Consequently, the OR circuit 910 generates an output signal as shown by (H) in FIG. 5 as pulse signals shown by (C) and (G) are inputted to its both terminals of the OR circuit 910. The output signal of the OR circuit 910 as shown by (H) in FIG. 5 is used as the ignition timing signal to trigger the thyristor 7 on. Soon after the ignition timing signal goes high the switch 700 is activated so that the operational capacitor 108 is forced to complete the discharge instantaneously in synchronism with the leading edge portion of the ignition timing signal. Thereafter, the operational capacitor 108 again starts the charge with the constant current ic at a position, namely, the falling edge portion of the ignition timing signal at which the switches 600 and 700 both are opened. The time-varying voltage of the operational capacitor 108 due to its charging and discharging action is shown by (E) in FIG. 5.

Figure 6:
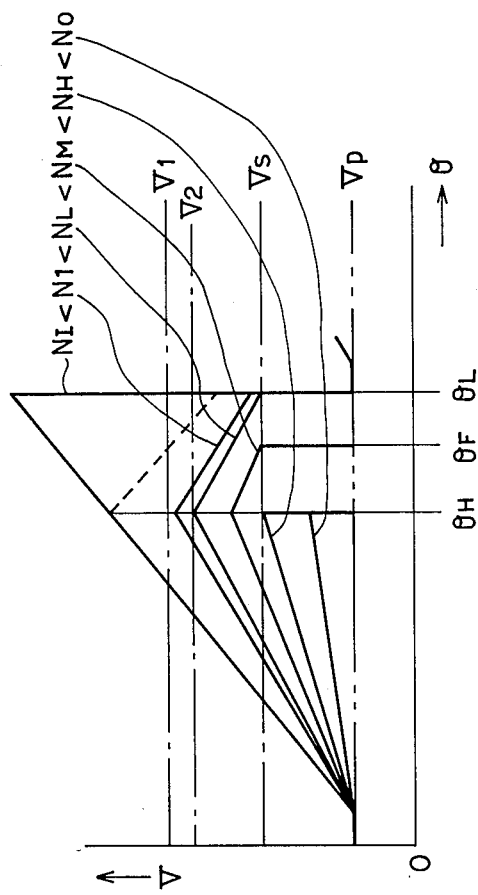
FIG. 6 shows a voltage waveform of the capacitor shown in FIG. 2.

The manner in which the ignition timing is computed for a wide engine speed is shown in FIG. 6 using the time-varying voltage of the operational capacitor 108 in more detail where $N_1$, $N_M$ and $N_O$ mean the low, middle and high engine rotational speeds, respectively. The terminal voltage of the operational capacitor 108 varies inversely as the rotational speed increases, for example, at the angular position $\theta_H$. In this condition, when the rotational speed is low or $N_1$ the terminal voltage of the operational capacitor 108 is higher at the angular position $\theta_H$ than those of other rotational speeds $N_M$ and $N_O$. When discharging, the terminal voltage of the operational capacitor 108 tries to reach the reference voltage level $V_S$ at a point delayed in time with respect to the angular position $\theta_L$, however, the ignition is forcibly timed to occur at the angular position $\theta_L$ by the negative voltage signal of the sensor 2. When the rotational speed reaches $N_M$ greater than $N_1$, a time during which the operational capacitor 108 is charged becomes shorter and the operational capacitor's voltage at the high-speed fixed advance angular position $\theta_H$ is lower, compared with that of the rotational speed $N_1$, thus the operational capacitor's discharge voltage reaching the reference voltage $V_S$ before the angular position $\theta_L$ in time. In the other words, the ignition timing is gradually advanced from the angular position $\theta_L$ in time to the angular position $\theta_H$ after the rotational speed exceeds a certain rotational speed $N_L$ as shown by the solid line $N_M$ in FIG. 6. Thereafter, the ignition is timed to occur at a nearer point to the angular position $\theta_H$ as the rotational speed increases. When the rotational speed is $N_O$ which is higher than $N_M$, a time during which the operational capacitor 108 is charged with the constant current ic is shorter than that of $N_M$, so that the terminal voltage of the operational capacitor 108 is lower at the angular position $\theta_H$ than the reference voltage $V_S$. In this case, the comparator 800 always generates a high level output, therefore, forcibly timing the ignition to occur when the Q output of the flip-flop 300 goes high, namely, at the high-speed fixed advance angular position $\theta_H$. It is further understood from the FIG. 6 that even if the rotational speed exceeds $N_H$ the ignition timing is always fixed to the advance angular position $\theta_H$.

Next, with the construction described above, the operation of the advance angle adjusting circuit 70 of the present invention under a condition that the output voltage V+ of the constant voltage circuit 50 is not adequately regulated is described with reference to FIG. 7, but without referring to the rotational speed detecting circuit 850 for clarity. The time-varying output voltage V+ of the constant voltage circuit 50 after cranking the engine is shown by (A), the output signal waveforms of the sensor 2, the comparators 100 and 200, the power supply voltage detecting circuit 71, the set circuit 940, the AND circuit 950, and the flip-flop 300 are shown by (B) through (H) respectively. Further, the terminal voltage waveform of the operational capacitor 108 is shown by (I) and other output signal waveforms of the comparator 800, the AND circuit 900 and the OR circuit 910 are shown in FIG. 7 (J) to (L) respectively.

Figure 7:
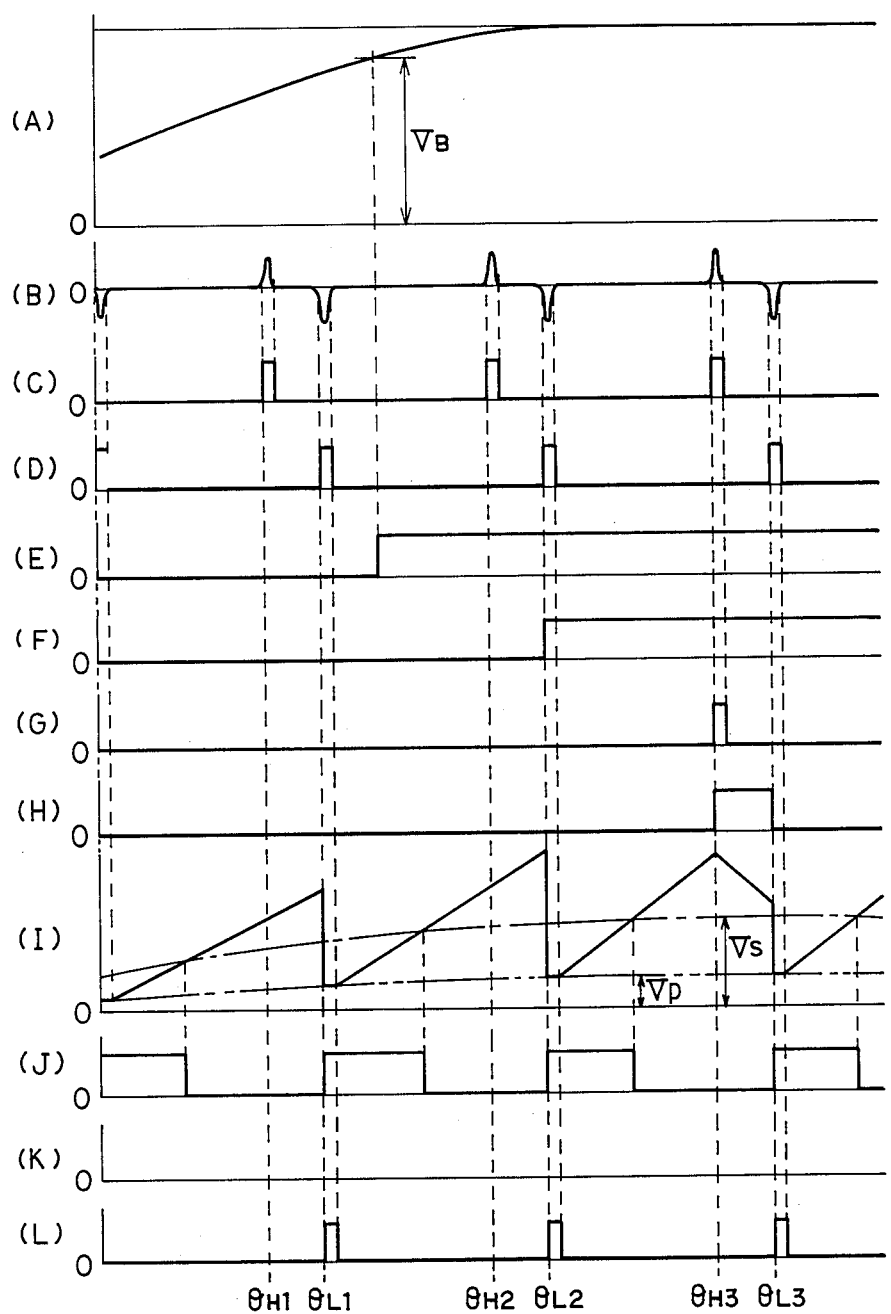

The output shown by (E) of the power supply voltage detecting circuit 71 remains low until the output voltage V+ of the constant voltage circuit 50 reaches a predetermined detecting voltage $V_B$ as shown by (A) in FIG. 7, and the output of the set circuit 940 also remains low as shown by (F) in FIG. 7, thus resulting in no output at the output terminal of the AND circuit 950 as shown by (G) in FIG. 7. In this condition, even if the comparator 100 generates the high level signal at an angular position $\theta_{H1}$ as shown by (C) in FIG. 7, no set signal is inputted to the set input terminal of the flip-flop 300 and thus allowing the further charging action of the operational capacitor 108 to a low-speed fixed advanced angular position $\theta_{L1}$ in time, at which position the flip-flop 300 is reset upon receipt of a set signal from the comparator 200 in synchronism with the negative pulse of the sensor's output as shown by (B) and (D) in FIG. 7. The operational capacitor 108 is then forced to complete the discharge instantaneously at the angular position $\theta_{L1}$ as shown by (I) in FIG. 7. Accordingly, an advance angular pulse goes high at the low-speed fixed advance angular position $\theta_{L1}$, thus preventing the engine operated at an excessive advance angle operation mode.

In the above condition, if the output voltage V+ of the constant voltage circuit 50 reaches the predetermined voltage level $V_B$ between the angular positions $\theta_{L1}$ and $\theta_{H2}$ in time, as in the manner described above, no set signal is appeared at the set input terminal of the set circuit 940 and the operational capacitor 108 continues, even passing the angular position $\theta_{H2}$, the charging action further to a angular position $\theta_{L2}$ accordingly, the advance angular pulse goes high at the angular position $\theta_{L2}$.

However, the set signal is impressed on the set circuit 940 at the angular position $\theta_{L2}$ after the output voltage V+ of the constant voltage circuit 50 has reached the detecting voltage $V_B$ as shown by (A) in FIG. 7, the output of the set circuit 940 going high at the angular position $\theta_{L2}$ as shown by (F) in FIG. 7. Thereafter, at an angular position $\theta_{H3}$ the output from the advance angle adjusting circuit 70 is applied as the set signal to the set input terminal of the flip-flop 300 and thus causing the discharging action of the operational capacitor 108 at the angular position $\theta_{H3}$ as shown by (G) and (I) in FIG. 7.

The terminal voltage of the operational capacitor 108 is so high at the angular position $\theta_{H3}$, by the time the output voltage V+ of the constant voltage circuit 50 has reached the saturated, stable and constant-current voltage $V_B$ that though the operational capacitor 108 discharges at the angular position $\theta_{H3}$ it is possible to execute the advance angle operation processing to provide the accurate ignition timing in response to various engine rotational speeds, preventing the engine operated at the excessive advance angle operation mode.

While, in the above-described embodiment, not executing the advance angle operation by staring the discharge of the operational capacitor 108 at an angular position $\theta_{Hn}$ after confirming a fact that the output voltage V+ has reached the almost saturated voltage $V_B$, but rather the accurate advance angle for ignition timing is computed by the procedure outlined above, namely, first, resetting an advance angle computing stop order by the reference angular position signal at an angular position $\theta_{Ln}$ in time after an angular position at which the output voltage V+ has reached $V_B$, second, computing an average engine rotational speed (the terminal voltage of the operational capacitor 108 varies inversely as the average engine rotational speed increases at the angular position $\theta_H$) with respect to the terminal voltage or the charged voltage of the operational capacitor 108 at an angular position $\theta_{Hn+1}$, third, discharging the operational capacitor 108 with constant current so as to determine an accurate advance angle for the ignition timing, with respect to the average rotational speed and thus preventing the engine operated at an excessive advance angle operation mode caused by an advance angle computation based on the average rotational speed calcurated between a period in which the output voltage V+ of the constant voltage circuit 50 varies to a great extent when at start up.

Further, while, in the above-described embodiment, the discharging current at several times charging current is controlled not to flow when the engine is cranked and also when the engine is running at the low rotational speed, thus providing a less power consumption and fast voltage response ignition timing adjusting system with improved ignitability, the system thus has a great advantage when used for an ignition system with a magneto-type generator used as the power source, the generation power of which becomes less powerful at the low rotational speeds.

Now, referring again to FIG. 6, the operation of the rotational speed detecting circuit 850 of the present invention will be explained under such condition that the output voltage V+ of the constant voltage circuit 50 has reached $V_B$ and is adequately regulated. The operation of the advance angle adjusting circuit 70 is omitted for clarity. In FIG. 6, $N_I$ is an idling rotation mode and $N_L$ is a rotational speed at which the advance angle action occurs. If the terminal voltage of the operational capacitor 108 reaches $V_2$ at the angular position $\theta_H$, as the terminal of the operational capacitor 108 is connected to the inverting terminal of the comparator 854 and thus the voltage $V_2$ also appearing at the inverting terminal of the comparator 854. On the other hand, to its non-inverting terminal is always applied a reference voltage $V_1$ generated by dividing the output voltage V+ with the series-parallel combination of the resistors 851 and 852 and the capacitor 853 as shown in FIG. 2. In this condition, the reference voltage $V_1$ has such a predetermined set value slightly higher than the voltage level $V_2$ that the output of the comparator 854 is low between an angular position $\theta_A$ in time and an angular position $\theta_L$ at the rotational speed $N_I$ (idling rotation mode).

As the output from the comparator 100 (a first fixed angular signal) via the advance angular adjusting circuit 70 and the output of the comparator 854 are applied as its inputs to the AND circuit 855, the output of the comparator 100 being the fist fixed angular signal can not be used as the set signal for setting the flip-flop 300 at the rotational speed $N_I$, thus causing the Q output of the flip-flop 300 to remain at low, this also causing further charging action of the operational capacitor 108 as shown by the solid line in FIG. 6 at the rotational speed $N_I$, without the discharging action at the angular position $\theta_H$ (in the prior art, the charging action occurs at the angular position $\theta_H$ as shown by the broken line in FIG. 6). Therefore, the charging action continues passing the first fixed angular position $\theta_H$ and the operational capacitor voltage never reaching the reference voltage level $V_S$, thus forcibly timing the ignition to occur at the low-speed fixed angular position $\theta_L$.

In addition, the output of the comparator 100 as the first fixed angular signal is used as the set input for setting the flip-flop 300 at an engine rotational speed which is little lower than the rotational speed $N_L$ at which the advance angle action occurs, so that when the rotational speed is more than that the circuit operates in the same manner as the conventional circuit acts.

Figure 8:
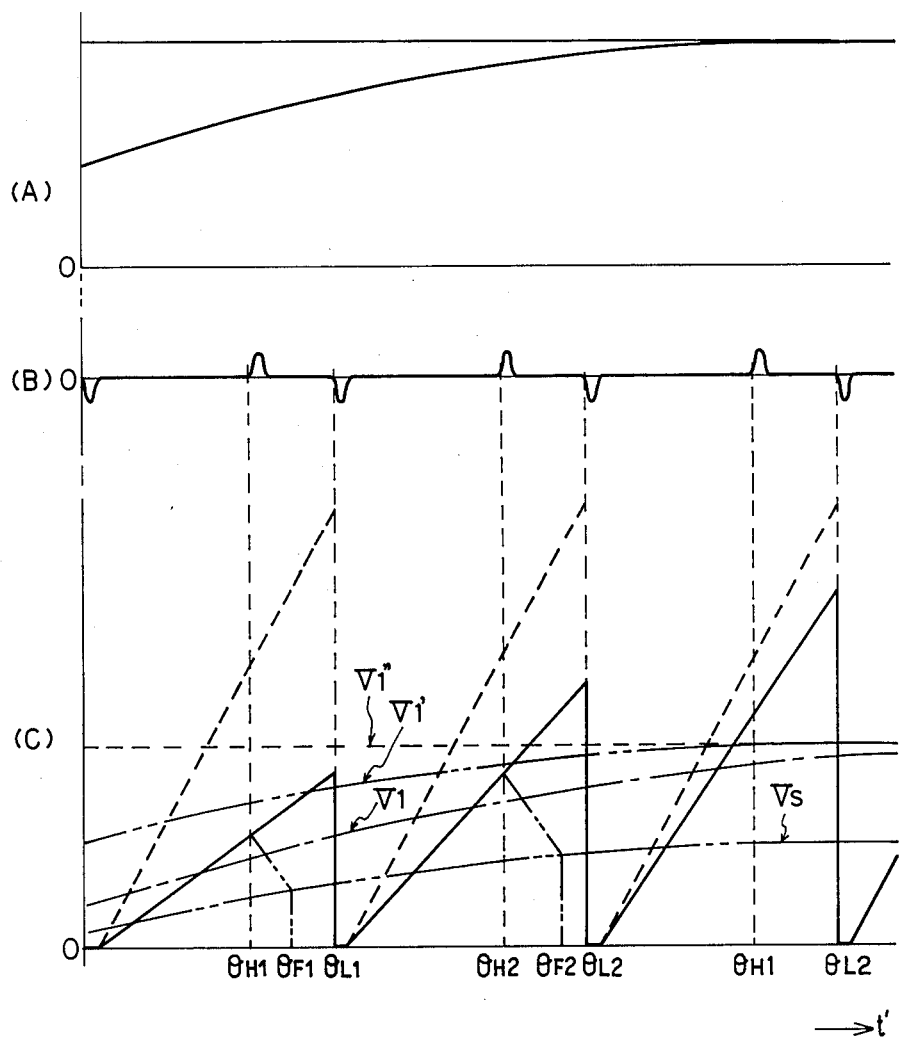

Next, the operation of the rotational speed detecting circuit 850 of the present invention will now be explained under such condition that the output voltage V+ of the constant voltage circuit 50 is not yet adequately regulated, with reference to the drawing of FIG. 8. In this case, too, the circuit operation is described without referring to the advance angle adjusting circuit 70 for clear explanation or clarity. The voltage-response characteristics of the output voltage V+ of the constant voltage circuit, the signal voltage of the sensor 2 and the terminal voltage of the operational capacitor 108 are shown by (A), (B) and (C) in FIG. 8 respectively, in case that the engine is operated at an idling mode, for example, at the rotational speed $N_I$ which is lower than the rotational speed $N_L$ at which the advance angle action occurs. As shown by each solid line of FIG. 8(C), the operational capacitor voltage at the angular position $\theta_{L2}$ in time when the output voltage V+ has reached the voltage level $V_2$ and is adequately regulated, is higher than that at the angular position $\theta_{L1}$ in time when the output voltage V+ has not yet reached $V_2$. In a region where the peak charge voltage of the operational capacitor 108 increases as the output voltage V+ increases.

In this case, if a divided voltage divide by the resistors 851 and 852 (without the capacitor 853) is used as the reference voltage $V_{1\theta}$(as shown by the dot-dash line in FIG. 8(C)) for the non-inverting terminal of the comparator 854 of the rotational speed detecting circuit 850 the first fixed angular signal at the angular positions $\theta_{H1}$ and $\theta_{H2}$ set the flip-flop 300 as the set signal and the operational capacitor 108 starts the discharge at the angular positions $\theta_{H1}$ and $\theta_{H2}$, whereby the ignition is forcibly timed to occur at the angular positions $\theta_{F1}$ and $\theta_{F2}$ respectively at which the discharging voltage of the operational capacitor 108 becomes smaller compared with the reference voltage $V_S$, thus resulting in the excessive advance angular position operation mode. However, while in the afore-described embodiment of the present invention, the reference voltage $V_1$ generated by the series-parallel combination of the resistors 851 and 852 and the capacitor 853 which has a relatively larger time constant (as shown by the dot-and dash line in FIG. 8C), compared with the voltage-response characteristics of the output voltage V+ of the constant voltage circuit 50, is impressed as its reference voltage on the non-inverting terminal of the comparator 854, even when the first fxed angular signal is given, the flip-flop 300 is not set at the angular positions $\theta_{H1}$ and $\theta_{H2}$ and the operational capacitor 108 continues the charging action thereafter, whereby the ignition is forcibly timed to occur at the low-speed fixed angular positions $\theta_{L1}$ and $\theta_{L2}$, respectively.

Figure 9:
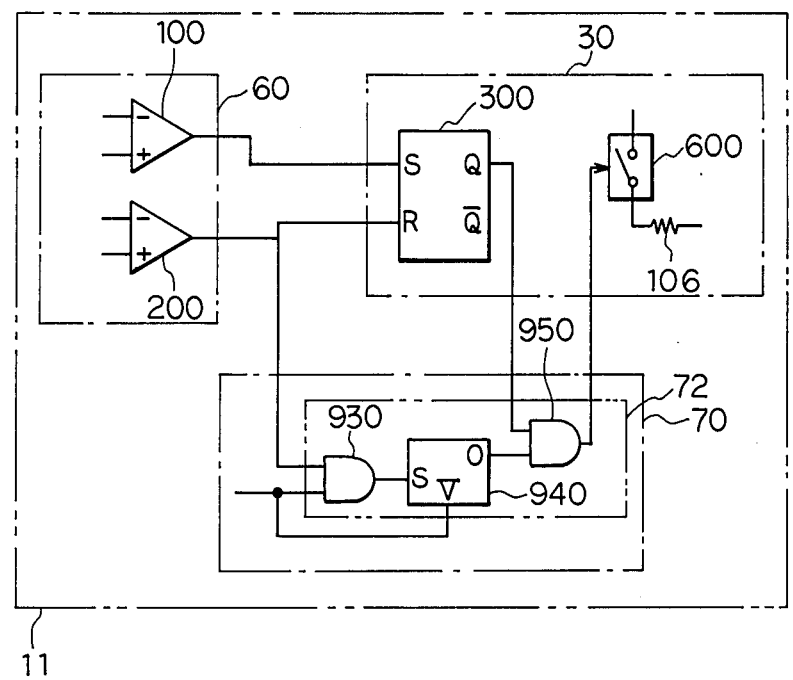
FIG. 9 shows a wiring diagram showing an important part of the ignition timing adjusting circuit of a second embodiment of the system according to the present invention.
Figure 10:
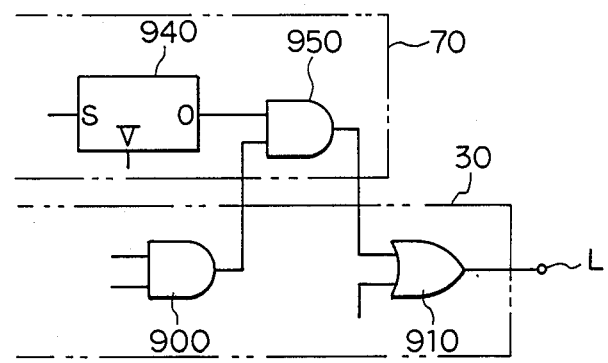
FIG. 10 shows a wiring diagram showing an important part of the ignition timing adjusting circuit of a third embodiment of the system according to the present invention.

While, in the first embodiment of this invention described above, the advance angle adjusting circuit 70 is arranged such that the supply of the reference angular signal to the set input terminal of the flip-flop 300 of the advance angle operation circuit 30 at the angular position $\theta_H$ determining the advance angle compute start timing or position is controlled, it may be arranged in order to achieve the very same effects as shown in FIG. 9 as a second embodiment of the system so that the Q output of the flip-flop 300 which is capable of being the advance angle compute start signal is controlled via the AND circuit 950. Furthermore, the output of the AND circuit 900 may be controlled via the AND circuit 950, as shown in FIG. 10 as a third embodiment of the system.

Figure 11:
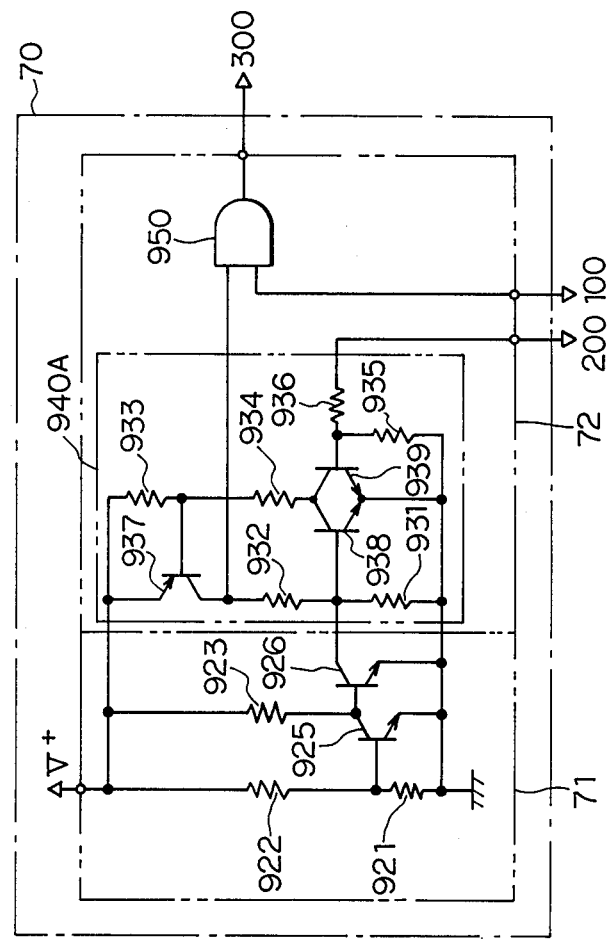
FIG. 11 shows an another embodiment of the advance angle adjusting circuit shown in FIG. 2.
Figure 12:
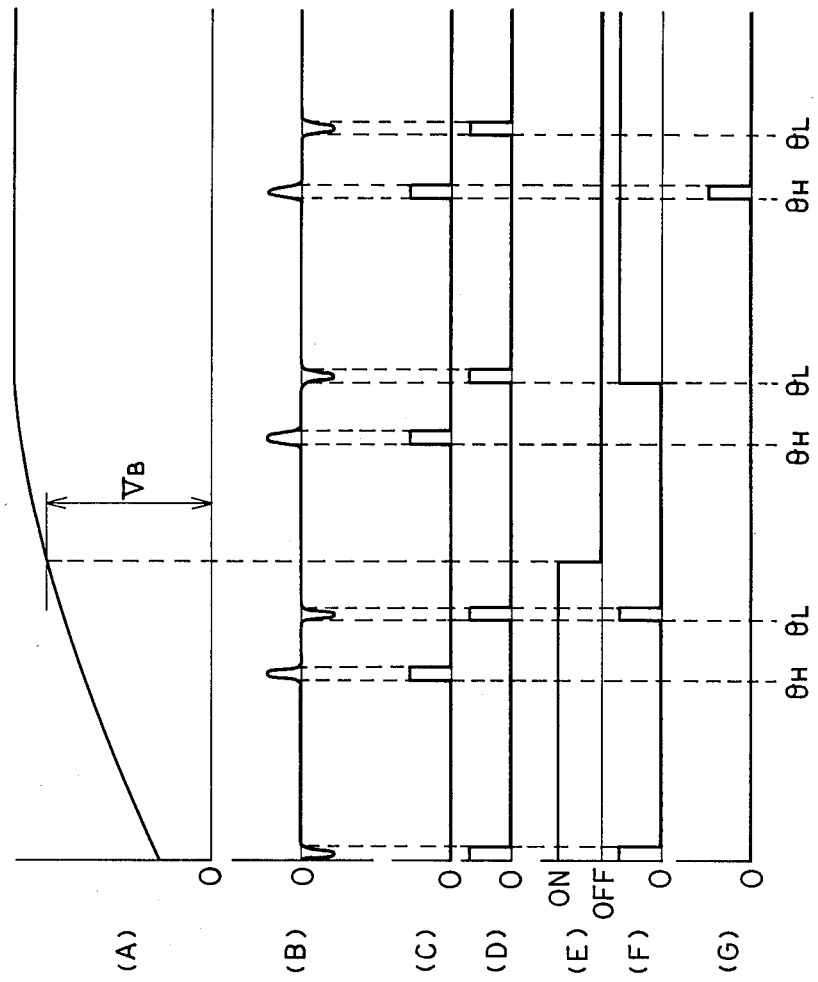
FIG. 12 is a signal waveform diagram useful for explaining the operation of the circuit shown in FIG. 11.

FIG. 11 shows another embodiment of the advance angle adjusting circuit 70 and its operational signal waveforms useful for explaining various parts of the circuit are shown by (A) to (G) in FIG. 12. (A), (B), (C), (D) and (G) in FIG. 12 are the same signal waveforms as shown by (A) to (D) and (G) in FIG. 7. In FIG. 11, the advance angle adjusting circuit 70 comprises the power supply voltage detecting circuit 71 and the input control circuit 72, wherein configurations of the power supply voltage circuit 71 are almost the same as that of the first embodiment of FIG. 2 except the resistor 924, the transistor 926, however, turns off when the output voltage V+ of the constant voltage circuit 50 is above the predetermined detecting voltage $V_B$ as shown by (E) in FIG. 12. The input control circuit 72 comprises the AND circuit 950 and a set circuit 940A including resistors 931 to 936 and transistors 937 to 939 as shown in FIG. 11. When the output voltage V+ of the constant voltage circuit 50 is lower than the voltage level $V_B$ the same signal waveform is generated at the collector terminal of the transistor 937 in synchronism with the output signal of the comparator 200, and when the output voltage V+ of the constant voltage circuit 50 is above $V_B$ it goes high in synchronism with the leading edge portion (the angular position $\theta_L$) of the output signal of the comparator 200 and remains the high level thereafter as shown by (F) in FIG. 12, whereby it becomes possible to supply the output signal of the comparator 100 to the set input terminal of the flip-flop 300 of the advance angle adjusting circuit 30 as shown by (G) in FIG. 12.

Figure 13:
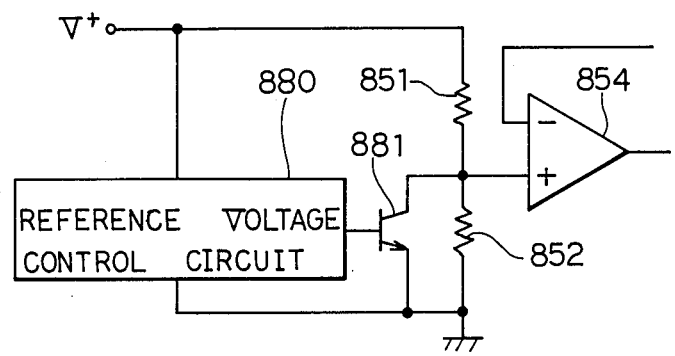
FIG. 13 shows a wiring diagram showing an important part of the engine rotational speed detecting circuit of a fourth embodiment of the system according to the present invention.

While, in the first embodiment of the present invention described above, the time constant of the series and parallel combination of the resistors 851 and 852 and the capacitor 853 is adequately selected so that the reference voltage $V_1$ determining the set rotational speed is lowered when the output voltage V+ has not reached $V_B$ and is not adequately regulated, in other words, this exactly equivalent to such a situation that the set rotational speed is set higher. However, not limited only to such resistor-capacitor time constant means described above, the set rotational speed changing means may include a reference voltage control circuit 880 and a PNP transistor 881 as a fourth embodiment as shown in FIG. 13, wherein the reference voltage control circuit 880 consisting of a timer and a power supply voltage detecting circuit switches the transistor 881 on and off to lower the reference voltage $V_1$ after having detecting the fact that the output voltage V+ of the constant voltage circuit 50 has reached the almost saturated voltage level $V_B$ and is adequately regulated.

Figure 14:
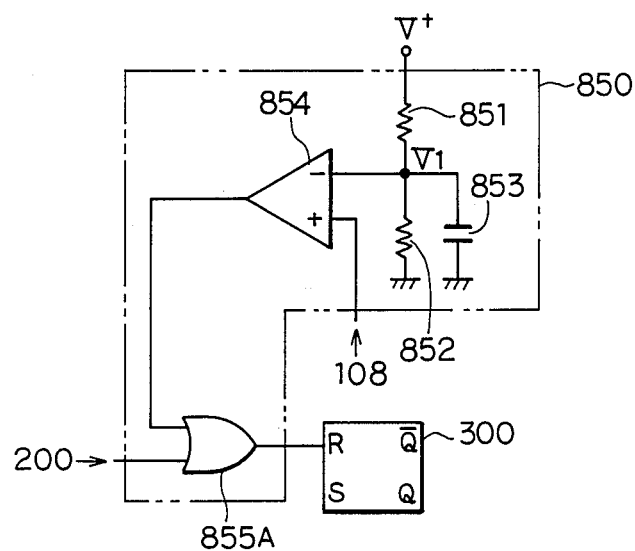
FIG. 14 shows a wiring diagram of the engine rotational speed detecting circuit of a fifth embodiment of the system according to the present invention.

Further, while, in the first embodiment of the present invention described above, the supply of the input signal to the set input terminal of the flip-flop 300 is controlled, the Q output of the flip-flop 300 or the output of the AND circuit 900 may be controlled in the system according to the present invention. Moreover, the same effects may be obtained according to a fifth embodiment of the system of the present invention as shown in FIG. 14, namely, when the terminal voltage of the operational capacitor 108 exceeds the reference voltage $V_1$ and the output of the comparator 854 goes high to reset the flip-flop 300 via an OR circuit 855, to thereby not allowing the discharge of the operational capacitor 108.

Figure 15:
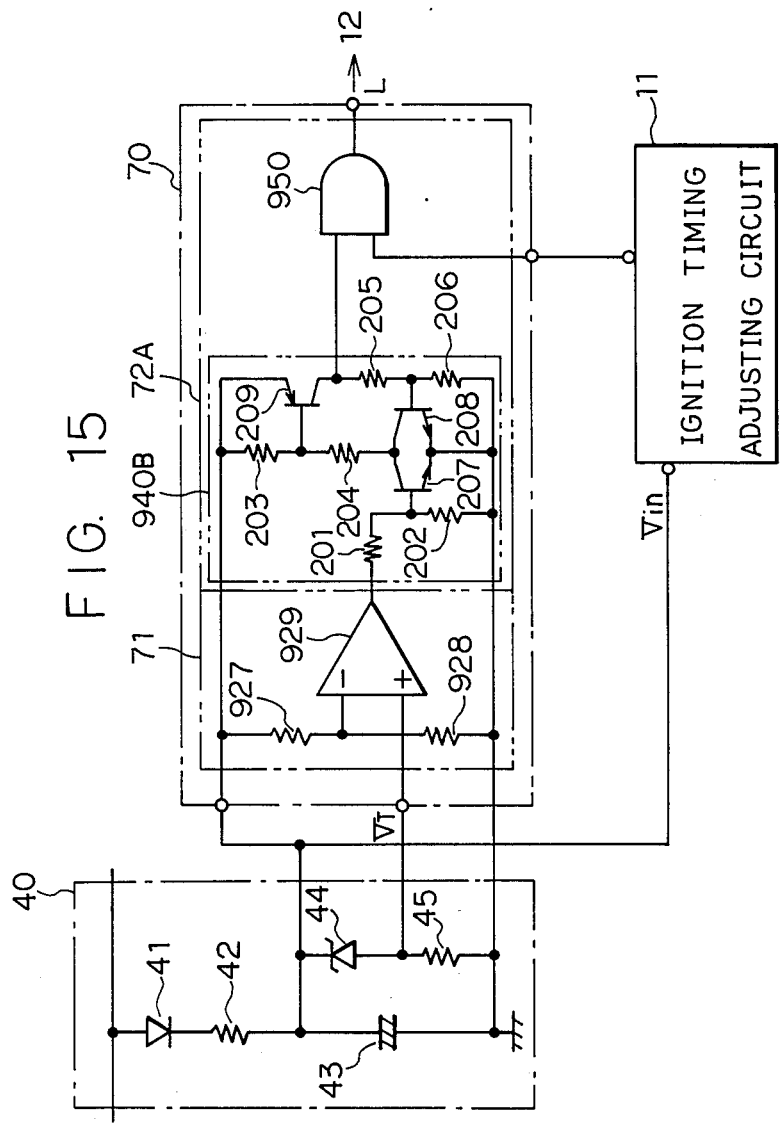
FIG. 15 shows a wiring diagram of an important part of a sixth embodiment of the system according to the present invention.

FIG. 15 shows a sixth embodiment of the system of the present invention, wherein a resistor 45 is connected in series with the zener diode 44 of the power supply circuit 40, a juncture between the zener diode 44 and the resistor 45 is connected to the non-inverting terminal of a comparator 929 and a juncture between dividing resistors 927 and 928 is connected to the inverting terminal of the comparator 929. The dividing resistors 927 and 928 and the comparator 929 make up the power supply voltage detecting circuit 71, the output of which being applied to a set circuit 940B consisting of resistors 201 to 206 and transistors 207 to 209. The output of the set circuit 940B is connected to one of the input terminals of the AND circuit 950, the other input terminal of the set circuit 940B being connected to the output terminal of the ignition timing adjusting circuit 11. The output of the AND circuit 950 is as the output (L terminal) of the advance angle adjusting circuit 70 connected to the gate of the thyristor 7 through the diode 12 of FIG. 1.

With the sixth embodiment of the system constructed as above, according to the present invention, the operation will now be described with reference to the signal waveforms shown by (A) to (F) in FIG. 16 as in the case of a four-pole rotor magneto-type generator driven by the internal combustion engine. The coil 1 generates two-cycles of sinewave output for each rotation of a rotor as shown by (A) in FIG. 16. On the other hand, the sensor 2 generates as shown by (C) in FIG. 16 a positive and a negative voltage signal at the angular position $\theta_H$ and $\theta_L$ respectively. In this condition, when the engine is cranked, the capacitor 43 is charged through the diode 41 and the resistor 42 during the positive pulse of the sinewave output of the coil 1 and is discharged by the various circuits of the system during the negative pulse, whereby the terminal voltage of the capacitor 43 ultimately reaches a constant voltage $V_Z$ governed by the zener diode 44 by repetition of the charging and discharging action as shown by (B) in FIG. 16. Thereafter, as the capacitor's terminal voltage has reached the zener voltage $V_Z$ it causes the zener diode 44 to conduct, so a voltage in response to the break-through current flowing through the zener diode 44 is developed across the resistor 45 in series with the zener diode 44 as shown by (D) in FIG. 16. It is understood from FIG. 16 that when the terminal voltage of the capacitor 43 has reached the saturated voltage $V_Z$, thereafter, a pulsative voltage is developed across the resistor 45 being the power-supply voltage saturation detecting means on the positive half-cycle of the output signal of the coil 1, which is insynchronism with the engine rotation.

Figure 16:
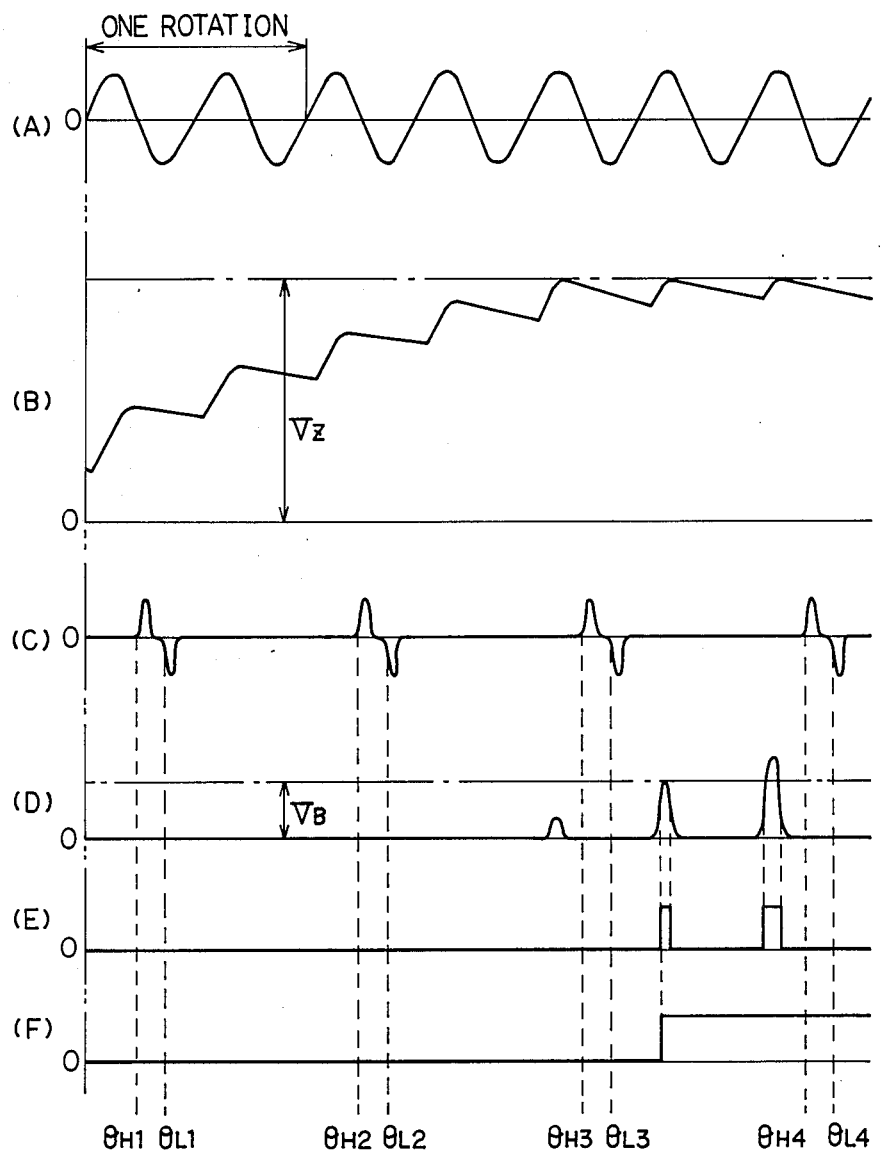
FIG. 16 is a signal waveform diagram useful for explaining the operation of the sixth embodiment shown in FIG. 15.

When the voltage across the resistor 45 exceeds $V_B$ the comparator 929 generates a pulsative triggering signal as shown by (E) in FIG. 16. This triggering signal makes a transistor 207 conductive, thus causing transistors 208 and 209 both conductive also, thereafter, even if the trigger signal from the comparator 929 is not supplied any more, the transistors 208 and 209 continue to be conductive, in other words, the set circuit 940B goes high in synchronism with the leading edge portion of the incoming trigger signal from the comparator 929 and is set holding the output a high level thereafter as shown by (F) in FIG. 16. Consequently, after the event that the power supply voltage $V_{in}$ of the power supply circuit 40 has reached $V_Z$, the advance angle output signal of the ignition timing adjusting circuit 11 is supplied as the ignition timing signal to the thyristor 7. In other words, before the power supply voltage $V_{in}$ of the power supply circuit 40 has not reached the saturated and constant voltage $V_B$ yet, the advance angle output signal of the ignition timing adjusting circuit 11 can not be supplied through the diode 12 to the thyristor 7 as one of the inputs of the AND circuit 950 is not energized at that time, so that the negative output signal of the sensor 2 generated at the reference angular position $\theta_L$ is applied directly to the gate of the thyristor 7 through the diode 6 as shown in FIG. 1, thus forcibly timing the ignition to occur at the low-speed fixed angular position $\theta_L$. Therefore, according to the above-described embodiment, until the power supply voltage $V_{in}$ of the power supply circuit 40 reaches the adequately regulated constant voltage $V_Z$ soon after cranking the engine, the advance angle output signal of the ignition timing adjusting circuit 11 is not supplied to the thyristor 7, thus, as described above, forcibly timing the ignition to occur at the low-speed fixed angular position $\theta_L$ to prevent the engine from being run at an excessively advanced angular position operation mode.

Figure 17:
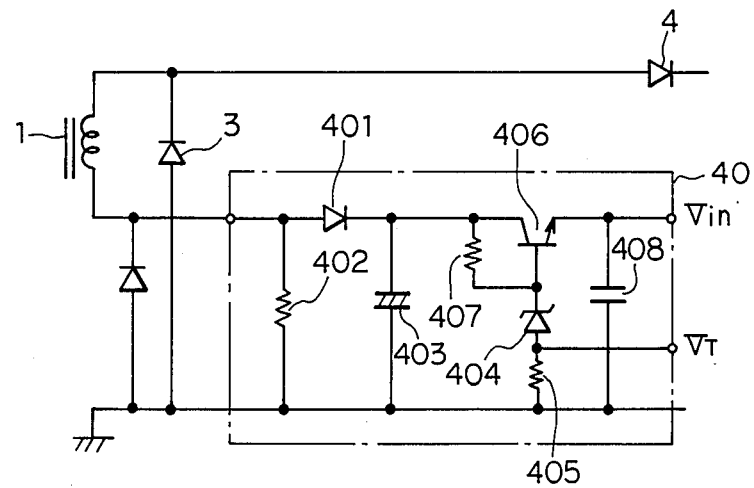
FIGS. 17 and 18 show wiring diagrams illustrating a first power supply circuit of seventh and eighth embodiments of the system according to the present invention, respectively.
Figure 18:
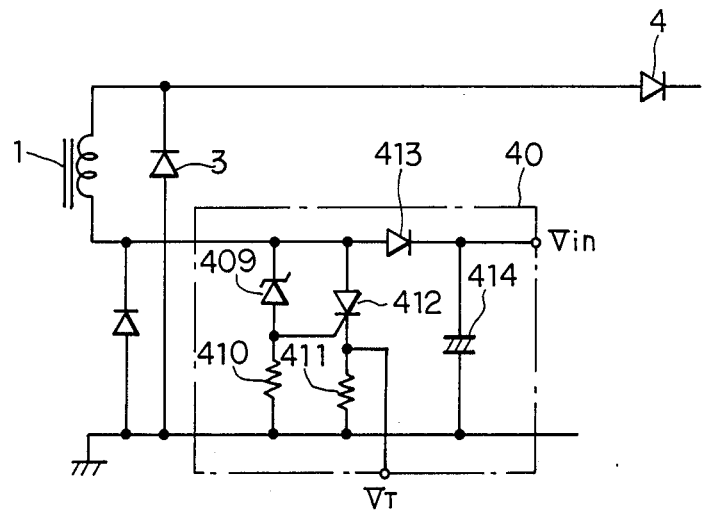

While, in the sixth embodiment described above, the power supply circuit 40 is a simple circuit including the zener diode 44, and receives its power from the positive output of the coil 1 (as shown by an arrow in FIG. 1), however, as shown by a seventh and eighth embodiments in FIGS. 17 and 18, the negative output (reverse voltage) of the coil 1 may also be used as the power source for the various circuits of the system. Further, other generation coil(s) of the magneto-type generator except the capacitor-charging coil 1 may also be used as the power source.

Accordingly, the power supply circuit 40 of the seventh embodiment described above has a well-known and simple circuit configuration such that a transistor 406, a resistor 407 and a smoothing capacitor 408 are added to the power supply circuit 40 of the first embodiment of FIG. 1, wherein the resistor 405 in series with the zener diode 405 connected to the both of the transistor 406 acts as means for detecting the power supply saturation voltage $V_T$ and for also applying the voltage $V_{in}$ for the circuits.

The power supply circuit 40 may also be composed, for example, as shown in FIG. 18 as the eighth embodiment of this invention, of a diode 413, a capacitor 414, a zener diode 409, a resistor 410 and a thyristor 412 forming a known voltage regulation circuit, and a resistor 411 connected in series with the cathode of the thyristor 412, whereby the resistor 411 acts a means for detecting the power supply saturation voltage $V_T$ through the conducting thyristor 412 and the voltage $V_{in}$ is also applied to the circuits of the system as well as in the seventh embodiment described above.

Further, while according to the object of the present invention, the advance angle computing method is never limited only to such method of using the charging voltage of the operational capacitor 108 with the constant current forming together with the operational amplifier 400 an integral circuit as disclosed in the specification, however, other known advance angle computing methods disclosed in Japanese un-examined Pat. Nos. 54-113733, 55-84863, 56-143351 and 58-44271 may be applied to the system of the present invention, which teach various methods for the advance angular position compution by using two operational amplifiers, or by varying the charging and the discharging current of an operational capacitor in response to an engine rotational speed, or by charging an operational capacitor with a first constant current source and discharging the capacitor with a second constant current source, or by using two operational capacitors.

What we claim is:

1. An electronic ignition timing adjusting system for an internal combustion engine for operating the engine with electronically adjusted ignition timing, said ignition timing adjusting system comprising:
   (1) a magneto-type generator driven by said internal combustion engine;
   (2) a constant voltage circuit energized by the output of said generator for producing a constant voltage output;
   (3) angular position detecting means for detecting first and second angular positions of a crank shaft of said engine and generating first and second corresponding detection signals respectively;
   (4) an advance angle computing circuit connected to said angular position detecting means and said constant voltage circuit for receiving said corresponding detection signals and for producing an electronically computed ignition timing signal in relation to said corresponding detection signals and said constant voltage output from said constant voltage circuit;
   (5) an advance angle adjusting circuit connected to said constant voltage circuit for detecting said constant voltage output from said constant voltage circuit and for cancelling said electronically computed ignition timing signal when said constant voltage output from said constant voltage circuit is lower than a voltage which is an absolute minimum voltage necessary for the accurate computation of ignition timing.

2. A system according to claim 1, wherein one of said corresponding detection signals generated at one of said two different angular positions which is not greater than the other angular position from a given reference point determines the ignition timing when said electronically computed ignition timing signal from said advance angle computing circuit is cancelled by said advance angle adjusting circuit, whereby the ignition is forcibly timed to occur at said angular position not greater than the other angular position.

3. A system according to claim 2, wherein said constant voltage circuit includes:
(1) a reference diode;
(2) power-supply saturation voltage detecting means connected in series with said reference diode for detecting whether said reference diode is conductive or nonconductive so as to generate an output signal in relation to an amount of current flowing through said reference diode when said reference diode is conductive; and
wherein said advance angle adjusting circuit includes a reset-set circuit connected to said power-supply saturation voltage dgecting means for being set upon receipt of said output signal from said power-supply saturation voltage detecting means and for outputting the corresponding output to control said advance angle computing circuit.

4. A system according to claim 1 wherein said first angular position is of maximum advance and said second angular position is of minimum advance.

5. A system according to claim 2 wherein said first angular position is of maximum advance and said second angular position is of maximum advance, the second detection signal being said one detection signal.

6. An electronic ignition timing adjusting system for an internal combustion engine for operating the engine with the electronically adjusted ignition timing, said ignition timing adjusting system comprising:
(1) a magneto-type generator driven by said internal combustion engine;
(2) angular position detecting means for detecting first and second angular positions of a crank shaft of an engine which rotates in synchronism with the rotation of the engine;
(3) an advance angle computing circuit including an operational capacitor for charging said capacitor from said second angular position in time to said first angular position and discharging said operational capacitor from said first angular position to thereby generate a sawtooth waveform signal and for producing a computed output signal so as to time the ignition to occur at an angular position at which the discharging voltage of said operational capacitor coincides with a predetermined reference voltage;
(4) a power supply circuit connected to and energized by the output of said generator and for applying power-supply voltages to said advance angle computing circuit; and
(5) a rotational speed detecting circuit for electronically detecting an engine rotational speed and forcibly timing the ignition to occur at said second angular position by cancelling said computing output signal from said advance angle computing circuit when said engine rotational speed is less than a set rotational speed;
wherein said rotational speed detecting circuit includes set rotational speed changing means for setting said set rotational speed higher when said power-supply voltages are not yet adequately regulated.

7. A system according to claim 6, wherein said rotational speed detecting circuit includes:
(1) a series-parallel combination circuit comprising two resistors connected in series and a capacitor representing said set rotational speed changing means connected in parallel with one of said resistors for generating a set voltage at a juncture between said resistors; and
(2) a comparator connected to said advance angle computing circuit for comparing said charging voltage of said operational capacitor with said set voltage.

8. An electronic ignition timing adjusting system for an internal combustion engine for operating the engine with electronically adjusted ignition timing, said system comprising:
(1) a magneto-type generator driven by said internal combustion engine;
(2) a constant voltage circuit energized by the output of said generator for producing a constant voltage output;
(3) angular position detecting means for detecting for a first angular position and a second angular position which is not greater than said first reference angular position from a given reference point and generating corresponding detection signals at said first and second angular positions respectively;
(4) an advance angle computing circuit connected to said angular position detecting means and constant voltage circuit for receiving said corresponding detection signals, and producing an electronically computed ignition timing signal in response to said corresponding detection signals and said constant voltage output;
(5) a power-supply voltage detecting circuit connected to said constant voltage circuit for detecting said constant voltage output from said constant voltage circuit and discriminating whether or not said constant voltage output is an absolute minimum voltage level necessary for the accurate computation of ignition timing by said advance angle computing circuit;
(6) a reset-set circuit connected to said power-supply voltage detecting circuit and being set by said corresponding detection signal generated at said second angular position and being reset when said constant voltage output of said constant voltage circuit is less than said absolute minimum voltage level; and
(7) an advance angle adjusting circuit connected to said reset-set circuit for cancelling said electronically computed ignition timing signal during a time that said reset-set circuit is reset, and for timing the ignition to occur at said second angular position of the crankshaft.

9. A system according to claim 8 further comprising a rotational speed detection circuit for electronically detecting an engine rotational speed and forcibly timing the ignition to occur at said second reference angular position by controlling said advance angle computing circuit when said engine rotational speed is less than a set rotational speed,
wherein said rotational speed detecting circuit includes set rotational speed changing means for setting said set rotational speed higher when said constant voltage output from said constant voltage circuit is not adequately regulated.

10. A system according to claim 8, wherein said advance angle adjusting circuit cancels said electronically computed ignition timing signal at the input of said advance angle computing circuit.

11. A system according to claim 8, wherein said advance angle adjusting circuit cancels said electronically computed ignition timing signal at the output of said advance angle computing circuit.

* * * * *